United States Patent [19]

Martenson

[11] Patent Number: 4,792,464

[45] Date of Patent: Dec. 20, 1988

[54] CORROSION COATING COMPOSITION

[76] Inventor: Irvin W. Martenson, 782 Shadow Grove Rd., Brea, Calif. 92670

[21] Appl. No.: 56,378

[22] Filed: Jun. 1, 1987

[51] Int. Cl.$^4$ .............................................. B05D 1/02
[52] U.S. Cl. ...................................... 427/156; 148/6; 252/181; 252/384; 252/394; 252/396; 427/388.4; 427/421
[58] Field of Search ............... 352/181, 396, 394, 384; 427/156, 388.4, 421; 148/6

[56] References Cited

U.S. PATENT DOCUMENTS

| 4,051,066 | 9/1977 | Miksio | 148/6 |
| 4,612,058 | 9/1986 | Geke et al. | 427/156 |
| 4,629,753 | 12/1986 | Quinn | 428/288.4 |

FOREIGN PATENT DOCUMENTS 993834  6/1965  United Kingdom ................ 427/156

Primary Examiner—Janyce A. Bell
Attorney, Agent, or Firm—Plante Strauss Vanderburgh

[57] ABSTRACT

There is disclosed a water-base coating composition and method for its use that forms a readily strippable protective film on metal surfaces. The composition includes a film former ingredient which is a terpolymer of polyvinyl butyral, polyvinyl alcohol and polyvinyl acetate. The water-base coating composition also contains a fugitive corrosion inhibitor, i.e., a corrosion inhibitor having a sufficient vapor pressure to impart corrosion resistance to surfaces coated with the film former composition. Suitable corrosion inhibitors are aromatic triazoles such as benzotriazole. A leveling agent such as morpholine is used to prevent the film from pulling from the edges during drying. Morpholine is particularly advantageous as it extends the working time when coating objects, and prevents the dispersion from clogging nozzles of spraying equipment. Morpholine also contributes to the corrosion inhibition of the coating.

11 Claims, No Drawings

CORROSION COATING COMPOSITION

BACKGROUND OF THE INVENTION

1. Field of the Invention

This invention relates to a coating composition for inhibiting corrosion of metals, and in particular, to a water-base coating composition that forms a readily strippable film on metal surfaces.

2. Brief Statement of the Prior Art

Various materials and methods have been used in attempts to provide a temporary corrosion protective coating for metal surfaces. In my prior patent, U.S. Pat. No. 4,584,175, I disclose preparation of plastic film which contains varioius corrosion inhibitors and which is effective in preventing corrosion of metal objects that are wrapped in the film. Many objects, however, are not readily wrapped in plastic film, and a need exists for a temporary coating which can be sprayed or otherwise applied to metal objects, and which can be readily stripped from the object once it has been removed from a corrosive environment. Film formers containing lead and zinc chromates and various polyacrylates have been used to coat metal objects. One of the difficulties with the polyacrylates and other film formers used heretofore has been that they are not readily strippable and, instead, must be dissolved from the surface of the metal. They are commonly removed by washing with an aqueous detergent or a weak aqueous solution of ammonia. In many instances, these coatings cannot be used because washing the coatings from the metal object is more damaging to the metal surfaces than the corrosion sought to be prevented. Thus metal surfaces having aluminum or zinc surfaces cannot be readily washed with most aqueous detergents.

Most film formers do not form readily strippable films which are impervious to gases such as oxygen and water vapor. Additionally, most strippable coatings do not adequately protect against scratches and other mars to the surface of the metal. The lack of toughness and film strength essentially precludes most film forming resins as suitable corrosion protective coatings.

BRIEF DESCRIPTION OF THE INVENTION

This invention is a water-base coating composition that forms a readily strippable protective film on metal surfaces. The composition includes a film former ingredient which is a terpolymer of polyvinyl butyral, polyvinyl alcohol and polyvinyl acetate. Sufficient plasticizer is included to impart the necessary degree of toughness and cross-linking to the film to permit stripping of the film from coated objects. The terpolymer film former is used in combination with a thickening agent such as hydroxyalkyl cellulose ethers to impart an adequate thixotropic property which permits working with the film forming material. Additionally, the film former is used with a leveling agent that prevents the film from pulling from the edges during drying. A suitable material for this purpose is morpholine. It has also been found that incorporation of morpholine in the aqueous dispersion of the terpolymer greatly extends the working time when coating objects, and prevents the dispersion from premature drying which can clog the nozzles of spraying equipment. As the morpholine has a substantial vapor pressure, it also contributes to the corrosion inhibition of the coating. The water-base coating composition also contains a fugitive corrosion inhibitor, i.e., a corrosion inhibitor having a sufficient vapor pressure to impart corrosion resistance to surfaces coated with the film former composition. Suitable corrosion inhibitors are aromatic triazoles such as benzotriazole.

The invention also includes a method for the preparation of the water-base coating composition in which the various ingredients are blended together using plasticizers for the terpolymer in sufficient quantities to make a homogeneous emulsion and to prevent precipitation of the various ingredients during mixing of the composition, a metal object is coated with the protective coating, and upon removal of the object from a corrosive environment, the coating is stripped from the object.

DESCRIPTION OF PREFERRED EMBODIMENT

This invention comprises a water-base coating composition for forming a temporary protective coating on metal surfaces, which has the property of being readily strippable, and to methods for preparing and using the water-base coating composition.

The water-base coating composition of the invention has a film former which is an aqueous solution of a terpolymer of polyvinyl butyral, polyvinyl alcohol and polyvinyl acetate, and a plasticizer. The film former ingredient of the waterbase coating composition is used in an aqueous dispersion containing from 20 to approximately 50 weight percent solids with approximately 20–30 percent of the solids being the a plasticizer for the terpolymer. The terpolymer contains from 75 to 90 percent polyvinyl butyral, up to 5 weight percent polyvinyl acetate, and from 9 to 25 percent polyvinyl alcohol, and has a molecular weight from 30,000 to 280,000.

The water-base coating composition also includes a sufficient quantity of a thixotropic additive to impart the desired thixotropic property. The thixotropic agent found useful with the aforementioned aqueous terpolymer dispersions is an aqueous solution of a hydroxyalkyl cellulose ether.

The water-base coating composition also contains a leveling agent to enhance the film forming properties of the resin. A suitable material for this purpose is morpholine. The morpholine in the aqueous dispersion of the terpolymer also greatly extends the working time of the coating composition when coating objects, and prevents the dispersion from premature drying which can clog the nozzles of spraying equipment Vapor corrosion inhibitors are incorporated in the water-base coating composition to inhibit corrosion of the coated object. The preferred corrosion inhibitors are aromatic triazoles which have a sufficient vapor pressure to inhibit corrosion of many metal surfaces which are coated with the composition. The corrosion inhibitors such as aromatic triazoles are incorporated into the water-base coating composition by forming a stable gel of the aromatic triazole in a plasticizer for the terpolymer. For this purpose, the plasticizer is gelled using a suitable organophilic, expanding lattice clay. This gel composition can then be blended into the aqueous dispersion of the terpolymer to produce a stable homogeneous water-base coating composition.

In some instances it may be desirable to impart a color to the coating composition. Suitable color ingredients which can be used include most pigments commonly used in paints. These are suspended in a plasticizer gel that is formed with an organophylic clay.

The following table summarizes the composition of the invention:

TABLE 1

| INGREDIENT | WEIGHT PERCENTAGE | |
|---|---|---|
| | Broad Range | Preferred Range |
| Film former[1] | 75–95% | 85–90% |
| Hydroxyalkyl cellulose ether[2] | 3–15% | 5–9% |
| Morpholine | 0.5–2% | 0.1–0.6% |
| Corrosion Inhibitor[3] | 0.1–2% | 0.3–1% |

[1] water dispersion of 20–50% plasticized terpolymer
[2] water dispersion of 0.5–2% hydroxyalkyl cellulose ether
[3] dispersion of 10–25% inhibitor in plasticizer

The Terpolymer Film Former

The terpolymers used as the water-base film former in the coating compositions of this invention are prepared by reaction of butyraldehyde with polyvinyl alcohol. The polyvinyl alcohol which is used is a high molecular weight synthetic resin which contains a varied proportion of hydroxyl and acetate groups, resulting from the partial hydrolysis of the acetate groups of polyvinyl acetate. The commercially available terpolymers are usually prepared from substantially hydrolyzed polyvinyl acetate, i.e., from polyvinyl alcohol containing no more than 15 to 30% unhydrolyzed acetate groups.

The terpolymer of polyvinyl butyral, polyvinyl alcohol and polyvinyl acetate is commercially available as a plasticized, aqueous dispersion.

The terpolymer comprises chiefly polyvinyl butyral which is from 75 to 90 percent, preferably from 80 to 88 percent, of the polymer. The polyvinyl alcohol is from 9 to 25 percent, preferably from 17 to 22 percent, of the polymer. The polyvinyl acetate is from 0.1 to 5 percent, preferably from 2 to 5 percent, of the polymer. The terpolymer has a weight average molecular weight from 30,000 to 250,000.

The aforementioned terpolymer is dispersed in water with a plasticizer to provide a toughness to the films formed from the dispersion. Commonly the aqueous dispersion of terpolymer contains from 25 to 50 weight percent, usually about 40 weight percent total solids.

The plasticizer is present in the aqueous dispersion in an amount from about 25 to about 35 weight percent of the total weight of solids. The liquid plasticizer should be stable in the resin, resistant to weeping from the resin, resistant to weathering and solvent attack.

Suitable plasticizers are esters of saturated mono- or di-basic alcohols, having from 2 to about 20 carbons with di- or tri-basic saturated aliphatic or aromatic acids or phosphoric acids. Examples of suitable alcohols are ethylene glycol, propylene glycol, hexamethylene glycol, etc. Examples of suitable monoalcohols include hexanol, amyl alcohol, octanol, isononanol, 2-ethylhexanol, etc. The aforementioned mono- or di-basic alcohols are esterified with a di- or tri-basic saturated or aromatic acid or phosphoric acid. Examples of suitable acids include the alpha, omega-aliphatic acids, e.g., oxalic, succinic, adipic, pimelic, suberic, azealic acids, etc. and other aliphatic dicarboxylic acids such as 2,5-octanedioic acid, 1,3-heptanedoic acid, etc. Suitable dicarboxylic aromatic acids include phthalic, isophthalic, terephthalic, benzoic, methylbenzoic, trimellitic acid, etc. Di- and tri-alkyl esters of phosphoric acid can also be used.

Examples of useful plasticizers which can be included in the dispersion are: dibutyl phthalate, dioctyl adipate, di-2-ethyl hexyl azelate, ethylene glycol dibenzoate, dilauryl phosphate, trihexyl phosphate, dioctyl phthalate, diisodecyl phthalate, diphenyl phthalate, dioctyl terephthalate, tricresyl phosphate, dibutyl sebacate, tributyl citrate, dihexyl adipate, polyethylene glycol ether glyceryl monooleate, butyl ricinoleate, etc. Preferably, dialkylphthalate esters having the following formula are used:

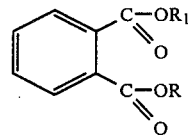

wherein R and $R_1$ are the same or different $C_5$ to $C_{12}$ alkyl groups. A particularly useful example is Santicizer 711, a product which is commercially available from Monsanto Chemical Company, in which the R groups are mixed $C_7$, $C_9$, and $C_{11}$ predominately linear alkyl groups.

Other plasticizers which can be used include liquids such as raw and processed castor oil, sulfonamide, blown linseed oil, and various rosin derivatives.

The aforementioned aqueous dispersion of a terpolymer film former and plasticizer is used in the final water-base coating composition at a concentration of from 75 to 95 weight percent, preferably from about 85 to 90 weight percent, based on the weight of the final water-base coating composition.

The Thixotropic Additive

The thixotropic additive which is used to impart a desirable workability to the film former water-base coating composition is a hydroxyalkyl cellulose ether. These cellulose ethers are prepared by the reaction of an alkylene oxide and methyl chloride with cellulose. Use of various alkylene oxides, typically those having from 3 to about 6 carbons, produces the corresponding ether, e.g., use of propylene oxide and methylene chloride produces hydroxypropyl methyl cellulose and the use of butylene oxide and methyl chloride produces hydroxybutylmethyl cellulose. The aforementioned cellulose ethers are commercially available in powdered and grannular form and are used in the preparation of the water-base coating composition by dissolving the cellulose ether in water, commonly at a concentration of from 0.5 to about 2.0 weight percent, preferably from about 0.7 to 1.0 weight percent. The resultant aqueous dispersion can be readily blended with the aforementioned aqueous dispersion of the terpolymer film forming resin.

The quantity of the hydroxyalkyl cellulose ether which is used in the water-base coating composition can be varied as required to impart the desired thixotropic characteristics to the water-base coating composition. Commonly, the aforementioned solutions of this additive are used at a concentration from about 3 to about 15 weight percent, preferably from about 5 to about 9 weight percent of the final water-base coating composition.

The Corrosion Inhibitor

A volatile corrosion inhibitor is incorporated in the water-base coating composition. The preferred volatile corrosion inhibitors are aromatic triazoles having the following general formula:

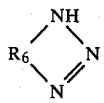

wherein $R_6$ is benzylene, naphthylene and $C_1$ to $C_6$ alkyl substituted benzylene and naphthylene groups. Examples of suitable materials are benzotriazole, tolyltriazole, and naphthyltriazole, etc.

Other suitable corrosion inhibitors which can be dispersed into the plasticizer and introduced into the coating composition in the same manner and at the same concentration are: monoethanolamine benzoate, and 2-ethyl,1-(N,N-dodecyl hydroxy-ethyl)amine ethylimadazoline.

The corrosion inhibitor is used at a concentration of from 10 to 25 percent, preferably from 12 to 15 percent in the plasticizer. This dispersion is employed at a concentration from 0.1 to 2.0 weight pecent, preferably from 0.3 to 1.0 weight percent, in the aqueous coating composition of the invention.

The aforementioned corrosion inhibitors can be incorporated in the aqueous base coating composition by forming a stable dispersion of the inhibitor, e.g., the aromatic triazole, in any of the aforementioned liquid plasticizers. To form a stable dispersion of the aromatic triazole in a liquid plasticizer, the plasticizer is gelled into a stable liquid gel by the addition of an organophylic, expanding lattice clay.

The Organoclay

Typically, the organophylic clay will be used at a concentration in the liquid plasticizer ingredient from about 1 to about 5, preferably from about 2 to about 3, weight percent.

The organophylic clay which is used to form a gel of the plasticizer is prepared by the reaction of an alkylamine with an acidified clay. Useful clays are swelling or expanding lattice clays such as found in Wyoming, South Dakota, Montana, Utah, Nevada and California. These expanding lattice clays include montmorillonite, vermiculite, nontronite, saponite, hectorite, etc., all having a three layer crystal. These clays are commonly found in admixture in bentonite clays having an average aluminum oxide content less than about 20 weight percent. The bentonite clays also have a high ion exchange capacity, commonly between about 50 and 150 milliequivalents, per 100 grams of the air-dried clay.

The aforedescribed clays are usually found in a form wherein their ion exchange sites are occupied with alkali and/or alkaline earth metals. The clays can be ion exchanged with an alkyl ammonium compound to form the organophylic clay or can be treated to exchange the alkali or alkaline metals with hydrogen. The hydrogen exchange is accomplished simply by acid washing the solid clay using a dilute mineral acid such a hydrochloric, nitric or sulfuric acid, and separating the solid from the acid by settling or filtering. A suspension of the clay can also be converted to the hydrogen form by passing the suspension over a hydrogen charged ion exchange solid such as Amberlite. The resultant aqueous suspension of hydrogen clay can be reacted with the alkylamine to form the organophylic clay. The organophylic clays are also commercially available from a number of sources, one class is designated as Bentone, available from National Lead Company.

The alkylammonium groups which are ion exchanged onto the clay can be mono-, di-, tri- or tetra-alkyl ammonium ions wherein the alkyl groups have from one to about twelve carbons. Examples of suitable ammonium ions for preparation of an organophylic clay are tetramethyl ammonium ion, 2-ethylhexyl ammonium ion, triethyl ammonium ion, dioctyl ammonium ion, tetrabutyl ammonium ion. etc.

The organophylic clay is employed in a finely subdivided state, typically in a powder form having a particle diameter passing a 20 mesh and retained on about 325 mesh Standard screen.

The Liquid Colorant

If desired, the coating composition of the invention can be mixed with a liquid color ingredient to impart any desired color to the film. Preferably a liquid colorant is used, and highly preferred liquid colorants which can be used for this purpose are those described and claimed in my prior U.S. Pat. No. 4,341,565. Briefly, these colorants comprise a gelled plasticizer in which is incorporated a suitable pigment. The plasticizer can be any of the aforementioned plasticizers which is gelled with any of the aforementioned organo clays to form a stable gel which will readily suspend pigments such as the organic and inorganic finely subdivided solids.

Useful inorganic pigments include oxides and salts of metals such as titanium, iron, lead, zinc, cadmium, mercury, chromium, molybdenum, etc. Titanium dioxide is predominantly used for white pigments, iron oxides for red, brown and tan pigments, lead chromate for yellow, lead molybdenates for orange, red colors, cadmium salts and oxides are used for red, maroon and yellow shades, etc. Carbon black can be used as a black pigment and various organic pigments such a organic azo compounds, phthalocyanine compounds, etc.

The aforementioned colorants are used with the water-base coating composition in a sufficient quantity to impart the desired color and shading. Commonly the colorants can be used at proportions of 1 to 5 parts of the liquid colorant per 100 weight parts of the water-base coating composition.

Morpholine

Morpholine is included in the water-base coating composition at a concentration from about 0.5 to about 2, preferably from about 0.1 to about 0.6 weight percent. The morpholine serves as a leveling agent and also functions as a fugitive corrosion inhibitor, thus enhancing the overall effectiveness of the composition. It has been found that the morpholine also significantly extends the working life of the terpolymer dispersion. It is believed that the morpholine is sufficiently volatile that it forms a protective atmosphere about the spray head and freshly coated surface, and that this atmosphere effectively excludes oxygen from the terpolymer, thereby showing its curing into a tough film. As the terpolymer dispersions are also used for other coating applications, other than for the specific corrosion inhibiting coating of this invention, this discovery can be applied to prepare an improved coating composition of the terpolymer dispersion.

The invention will be illustrated and the results demonstrated by the following examples:

EXAMPLE 1

An anti-corrosion composition is prepared by preparing several premixes which are blended together to prepare the anti-corrosion composition. The premixes are: methocel mixture, a corrosion inhibitor mixture, and a color mixture. The methocel mixture is prepared by mixing water and a commercially available cellulose ether product in the following proportions:

| Methocel Mixture | |
| --- | --- |
| Ingredient | Weight parts |
| Water | 19.26 |
| Methocel F4M[1] | 0.49 |

[1] hydroxypropyl methylcellulose

The corrosion inhibitor mixture is prepared by forming a stable suspension of the inhibitor, such as benzotriazole, in a plasticizer. For this purpose, an organophilic clay is used. The following table sets out the proportions of these ingredients:

| Corrosion Inhibitor Premix No. 1 | |
| --- | --- |
| Ingredient | Weight parts |
| Plasticizer[1] | 370 |
| Organoclay[2] | 10.5 |
| Benzotriazole | 67.5 |

[1] phthalate diester of mixed $C_7$, $C_9$ and $C_{11}$ alkanols
[2] tetra-alkyl ammonium smectite A liquid color premix is prepared by mixing the following ingredients:

| Green Color Premix | |
| --- | --- |
| Ingredient | Weight Parts |
| Plasticizer[1] | 11 |
| Organoclay[2] | 0.1 |
| Green pigment[3] | 4 |

[1] phthalate diester of mixed $C_7$, $C_9$ and $C_{11}$ alkanols
[2] tetra-alkyl ammonium smectite
[3] phthalocyanine green Each of the premixes was prepared by blending together the ingredients with stirring for approximately 20 minutes, and then passing the resultant mixtures through a 3-roll roller mill.

The anti-corrosion coating was prepared by adding controlled amounts of the aforementioned premixes to a film former, which was a dispersion of a terpolymer of polyvinyl butyral, polyvinyl alcohol and polyvinyl acetate in water with a solids content of about 30 weight percent.

The final anti-corrosion composition was as follows:

| Anti-corrosion Composition | |
| --- | --- |
| Ingredient | Weight parts |
| Film former | 232.6 |
| Methocel premix | 18.6 |
| Corrosion Inhibitor premix | 0.6 |
| Morpholine | 1.7 |
| Color premix | 7 |

Each of the ingredients was added with stirring for approximately 20 minutes, being careful not to whip air into the mixture. After all the ingredients had been added, the resulting mixture was passed through a 3-roll roller mill to remove any air bubbles which may have formed during the mixing.

The anti-corrosion composition was applied to test plates of copper, mild steel, aluminum, brass. bronze, cadmium, nickel, and silver by spraying. The metal plates were approximately 8 by 10 inches and about ⅓ of the area of each plate was covered with masking tape prior to spraying. After the coatings had cured, the masking tape was removed to provide an uncoated area of each metal plate. The metal plates were then placed in an autoclave which was maintained at a relative humidity of 80% and a temperature of 30° C., where they maintained for 30 days. After the 30-day period, the plates were removed from the corrosive environment of the autoclave and inspected for evidence of corrosion. Severe corrosion in the form of pitting and undercutting was observed on all of the uncoated areas of the test plates. No corrosion was observed on any of the areas of the test plates which were coated with the anti-corrosion composition of the invention.

During the inspection, the protective coatings on the samples were peeled from the metal surfaces by lifting a corner of each coating and pulling the coating from the metal surface. The coatings separated cleanly, leaving no residue, and exposing a polished surface free of any corrosion.

EXAMPLE 2

A corrosion inhibitor premix is prepared substituting monoethanolamine benzoate for the benzotriazole of the preceding example. The premix has the following composition:

| Corrosion Inhibitor Premix No. 2 | |
| --- | --- |
| Ingredient | Weight parts |
| Plasticizer[1] | 370 |
| Organoclay[2] | 10.5 |
| Monoethanolamine benzoate | 67.5 |

[1] dioctyl terephthalate
[2] tetra-alkyl ammonium smectite

A white liquid colorant is also prepared having the following composition:

| White Color Premix | |
| --- | --- |
| Ingredient | Weight Parts |
| Plasticizer | 800 |
| Organoclay | 4 |
| $TiO_2$ pigment | 815 |

The resulting premixes are stable compositions and are used for the preparation of anti-corrosion compositions by direct substitution for the benzotriazole premix and the green color premix used in the preceding example. The resulting anti-corrosion composition is used as a coating on metal surfaces and found to exhibit equivalent corrosion inhibition to that of the preceding example.

EXAMPLE 3

A corrosion inhibitor premix is prepared having the following composition:

| Corrosion Inhibitor Premix No. 3 | |
| --- | --- |
| Ingredient | Weight parts |
| Plasticizer[1] | 425 |
| Organoclay[2] | 11 |
| 2-ethyl, 1-(N,N—dodecyl | 72 |

-continued

| Corrosion Inhibitor Premix No. 3 | |
|---|---|
| Ingredient | Weight parts |
| hydroxyethyl)amine ethylimadazoline | 5 |

[1]dibutyl sebacate
[2]tetra-alkyl ammonium smectite

The resulting dispersion is stable and is used for the preparation of anticorrosion coating compositions by substitution for the benzotriazole premix used in Example 1, and is observed to provide substantially the same corrosion protection.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method of temporarily protecting metal surfaces against corrosion which comprises:
   a. coating the surface of the metal surface with an anti-corrosion coating composition consisting essentially of:
      (1) an aqueous film former comprising 40 to 60 weight percent solids in water with the solids consisting of a terpolymer of from 75 to 90 percent of polyvinyl butyral, from 9 to 25 percent polyvinyl alcohol and from 0.1 to 5 percent polyvinyl acetate;
      (2) a sufficient quantity of a hydroxyalkyl cellulose ester in a sufficient quantity to impart thixotropic properties to said coating composition;
      (3) an corrosion inhibitor mixture comprising from 0.1 to 2 weight percent of an inhibitor selected from the class consisting of aromatic triazoles, monoethanolamine benzoate and 2-ethyl,1-(N,N-dodecyl hydroxyethyl)amine ethylimadazoline dispersed in a plasticizer for said polyvinyl butyral resin; and
      (4) from 0.5 to 2 weight percent morpholine;
   b. exposing the coated metal object to a corrosive environment; and
   c. removing the coating metal object from the corrosive environment and peeling the coating from the metal to expose a metal object free of corrosion.

2. The method of claim 1 wherein said coating composition is applied to said metal surface by spraying.

3. The method of claim 1 wherein said coating composition contains an aromatic triazoles having the following formula:

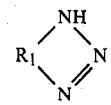

4. The method of claim 1 wherein said coating composition contains monoethanolamine benzoate.

5. The method of claim 1 wherein said coating composition contains 2-ethyl,1-(N,N-dodecyl hydroxyethyl)amine ethylimadazoline.

6. The method of claim 1 wherein said hydroxyalkyl cellulose ester is hydroxypropyl methylcellulose.

7. A corrosion inhibiting coating comprising:
   d. an aqueous film former comprising 40 to 60 weight percent solids in water with the solids consisting of a terpolymer of from 75 to 90 percent polyvinyl butyral, from 9 to 25 percent polyvinyl alcohol and from 0.1 to 5 percent polyvinyl acetate;
   e. a sufficient quantity of a hydroxyalkyl cellulose ester in a sufficient quantity to impart thixotropic properties to said coating composition;
   f. a corrosion inhibitor mixture comprising from 0.1 to 2 weight percent of an inhibitor selected from the class consisting of aromatic triazoles, monoethanolamine benzoate and 2-ethyl,1-(N,N-dodecyl hydroxyethyl)amine ethylimadazoline dispersed in a plasticizer for said polyvinyl butyral resin; and
   g. from 0.5 to 2 weight percent morpholine.

8. The corrosion inhibiting composition of claim 7 wherein said aromatic triazole has the following formula:

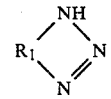

wherein $R^1$ is a benzylene, naphthalene and $C^1$ to $C^6$ alkyl substituted benzylene and naphthalene group.

9. The corrosion inhibiting composition of claim 7 wherein said corrosion inhibitor is monoethanolamine benzoate.

10. The method of claim 7 wherein said corrosion inhibitor is 2-ethyl,1-(N,N-dodecyl hydroxyethyl)amine ethylimadazoline.

11. The method of claim 7 wherein said hydroxyalkyl cellulose ester is hydroxypropyl methylcellulose.

* * * * *